United States Patent [19]

Siefert

[11] 4,365,867

[45] Dec. 28, 1982

[54] ELECTRICALLY ADJUSTABLE APPARATUS FOR MOTOR VEHICLE REAR VIEW MIRROR

[76] Inventor: Roland Siefert, Im Herrengarten 6, D-7737 Bad Dürrheim, Fed. Rep. of Germany

[21] Appl. No.: 217,759

[22] Filed: Dec. 18, 1980

[30] Foreign Application Priority Data

Dec. 22, 1979 [DE] Fed. Rep. of Germany ....... 2952084

[51] Int. Cl.³ .............................................. G02B 7/18
[52] U.S. Cl. .................................................. 350/289
[58] Field of Search ........................................ 350/289

[56] References Cited

FOREIGN PATENT DOCUMENTS 2011846 7/1979 United Kingdom ................ 350/289

Primary Examiner—F. L. Evans
Attorney, Agent, or Firm—Edward E. Pascal

[57] ABSTRACT

This invention relates to an electrically operated adjustable apparatus for a motor vehicle rear view mirror having a mirror casing, and included therein, a mirror support to which the mirror casing is connected via a first fixed junction point, and on a straight line through this first junction point and parallel thereto are two more junction points, the distance between the mirror casing and mirror support being electrically variable. The first fixed junction point is arranged to be very far from both further junction points, making a stable housing of the mirror support possible. Since both of the further junction points can be arranged on a small edge of the mirror support beside one another, it is possible to design the means for driving of both the two further junction points on the side of the mirror support which permits the mirror housing to be flat. The driving means are located preferably in a side housing unit in the vicinity where the mirror housing is connected with the motor vehicle. The adjustable device makes it possible to use light mirror housings made of plastic without solid metal supports.

19 Claims, 11 Drawing Figures

ELECTRICALLY ADJUSTABLE APPARATUS FOR MOTOR VEHICLE REAR VIEW MIRROR

This invention relates to an electrically operated adjustable apparatus for a motor vehicle rear view mirror having a mirror casing, and included therein, a mirror support to which the mirror casing is connected via a first fixed junction point, and on a straight line through this first junction point and parallel thereto are two more junction points, the distance between the mirror casing and mirror support being electrically variable.

Figure 1:
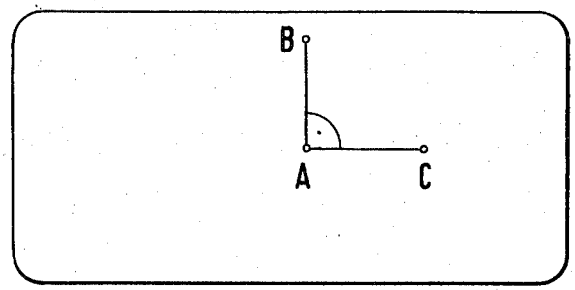

The structures will be explained with reference to FIG. 1. "A" depicts the first junction point, while points B and C depict the further junction points around which the distance between the mirror housing and the mirror support respectively can be varied. The joining lines AC and AB are shown here at a right angle to one another. Should junction point B be moved, the distance between the mirror holder and the mirror will be changed. The mirror then will tilt around the axis AC. Should however junction point C be moved, the distance between the mirror housing and the mirror support will be changed, and a tilt is effected around axis AB.

In order to achieve a stable suspension for the mirror holder, the triangle BAC should be chosen as large as possible. The size of this triangle is, essentially, limited by the size of the mirror.

Since the driving means for the link BC, being generally two electric motors with associated gearing, will have to be directly behind the mirror holder, the thickness of the rear view mirror is important. In order to avoid dirtying the drive means, it is necessary to enclose it or locate it behind a partition, which naturally further increases the thickness of the rear view mirror.

The problem is to design the adjusting apparatus such that the mirror support will be held stable and free of vibrations in a practically flat housing.

According to an embodiment of the invention, it is possible to arrange the first fixed junction point very far from both further junction points, making a stable housing of the mirror support possible. Since both of the further junction points can be arranged on a small edge of the mirror support beside one another, it is possible to design the means for driving of both the two further junction points on the side of the mirror support which permits the mirror housing to be flat. The driving means are located preferably in a side housing unit in the vicinity where the mirror housing is connected with the motor vehicle. The adjustable device makes it possible to use light mirror housings made of plastic without solid metal supports.

Furthermore, it is possible, in an uncomplicated way, to use only one electric motor to adjust the two further junction points which leads to cost effectiveness and further decreases the space requirements of the driving means.

Figure 2:
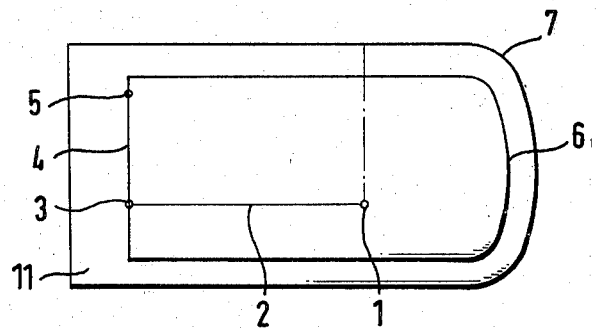
Figure 3:
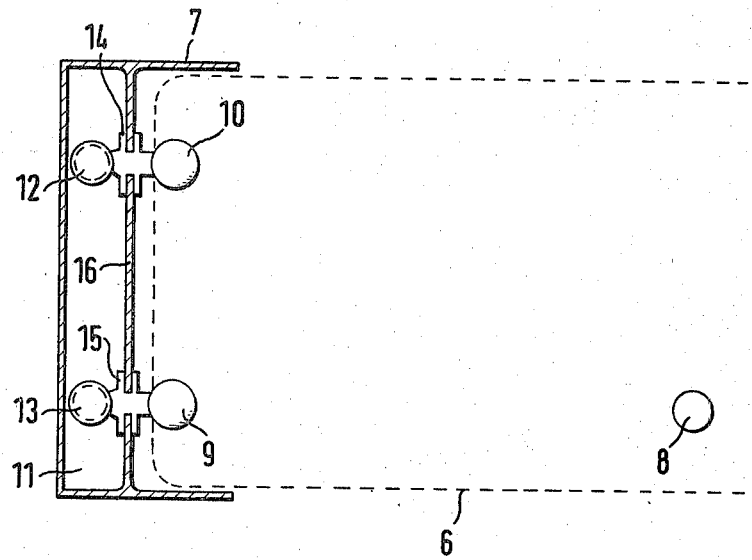
Figure 4:
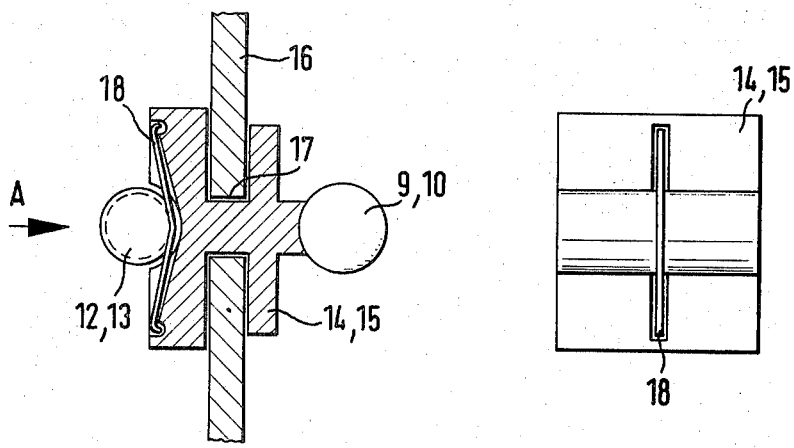
Figure 5:
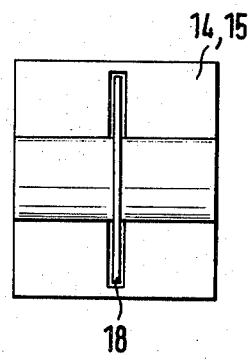
Figure 6:
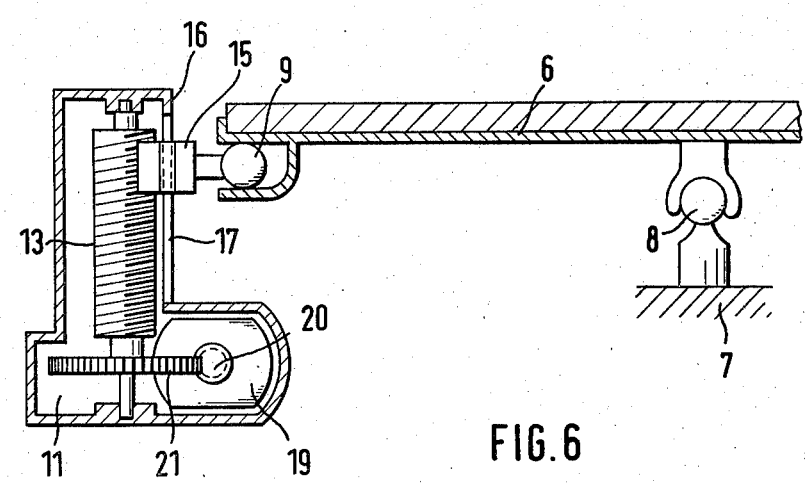
Figure 7:
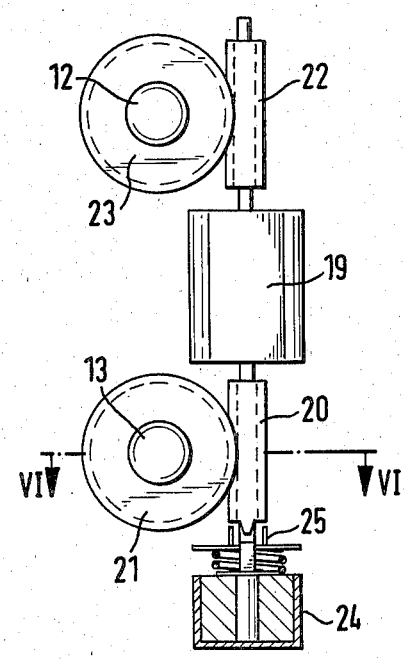
Figure 8:
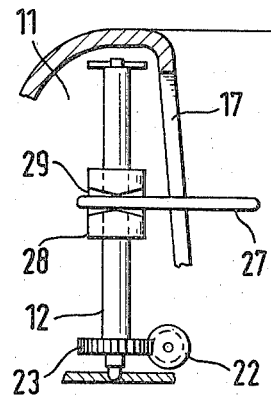
Figure 9:
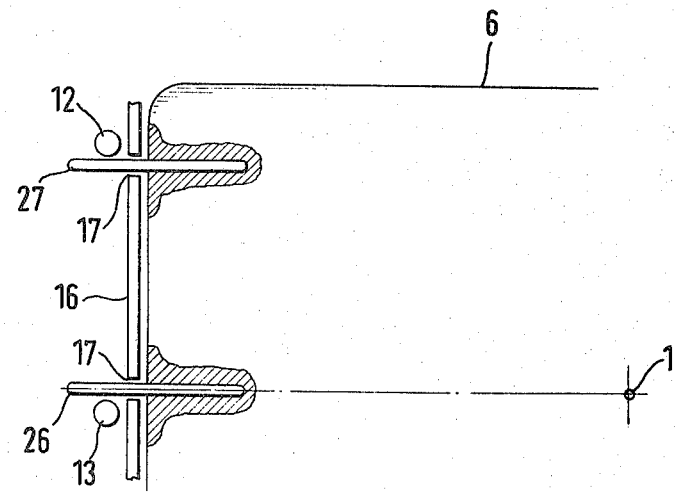
Figure 10:
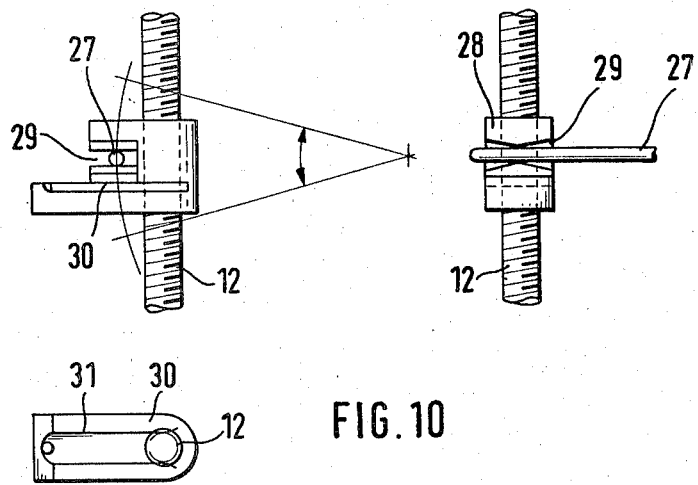

Embodiments of the invention will be more clearly explained below with reference the following drawings:

FIG. 2 schematic top view of the rear view mirror;

FIG. 3 a cross section of the housing in the area of the driving means according to a first embodiment;

FIG. 4 a cross section of a sliding socket to adjust one of the further junction points;

FIG. 5 a view of the sliding socket in the direction of arrow A shown in FIG. 4;

FIG. 6 a cross section through one of the junction points at right angles to the section according to FIG. 3;

FIG. 7 top view of a detailed embodiment of the driving means;

FIG. 8 a cross section corresponding to the cross section of FIG. 6 through one junction point according to a further embodiment;

FIG. 9 a rear view of the mirror holder according to the embodiment of FIG. 8;

FIG. 10 three views of an adjustable jaw and

Figure 11:
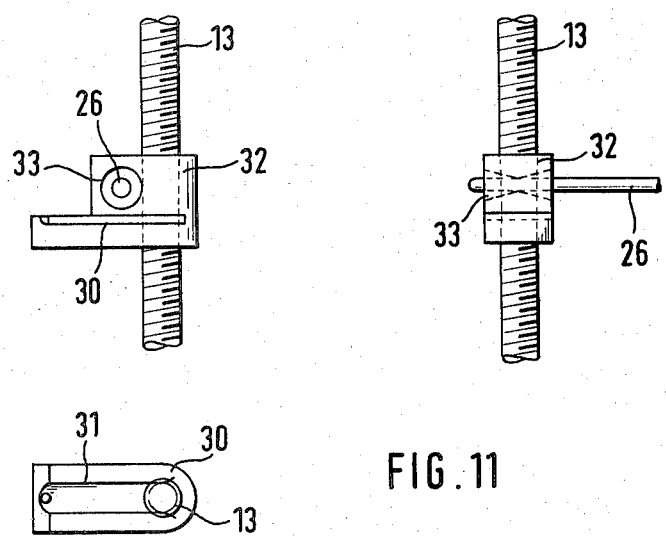

FIG. 11 three views of a further adjustable jaw, as they will be operated as used in FIGS. 8 and 9.

In FIG. 2 shows mirror housing 7 and mirror support 6 contained in the mirror housing. The first fixed junction point 1 between mirror housing 7 and mirror support 6 is arranged as far as possible to the furthest edge of the mirror. On the inner edge of the mirror holder 6 on a horizontal straight line 2 through this first junction point 1 a further junction point 3 is provided over which the distance between housing 7 and mirror holder 6 is variable. On a perpendicular 4 through the further junction point 3 a further junction point 5 is arranged, by which the distance between housing 7 and the mirror holder 6 is also variable. The three junction points 1, 3, 5, form a right-angled triangle by which the first fixed junction point 1 forms an outer point of the triangle.

Should the mirror holder be swung around a horizontal axis, that is around the horizontal straight line 2, the junction point 5 alone will be moved. Should, on the other hand, the mirror holder 6 be swung around a vertical swing axis through the first fixed point 1, then both further junction points 3, 5 will be moved.

It is possible through the sideways positioning of both further junction points 3, 5 to bring down the drive means into the side of the housing unit 11.

According to FIG. 3, the ball joint of the first fixed junction point 1 is indicated at 8. The ball joints 9 and 10 of the further junction points 3, 5 are respectively arranged on sliding sockets 14, 15 where a housing divider 16 fits into a slot 17, which divider divides off the housing unit 11 where the means of driving are arranged.

Each sliding socket 14, 15 will be shifted along the side of the respective slot 17 through a spindle 12 or 13, which will be driven by an electric motor. The drive connection between the sliding sockets 14, 15 and the spindles 12, 13 is made by an elastic wire 18. This wire 18 is arranged in a slotted hole, which is attached to the spindle 12 or 13 respectively, turned towards the side of the sliding coupling 14 or 15 respectively and which runs right across the respective spindle. This wire 18 lies against a thread of the spindle 12, 13. In this manner it is possible, in case of a failure of the driving means, to adjust the mirror manually using pressure on the mirror support in the region of the junction points 3, 5, the flexible wire 18 then springing over the thread of the respective spindle 12, 13.

FIG. 6 shows a cross section along the straight line 2. In the separate side housing unit 11, lies the spindle 13, which underneath supports a worm gear 21 which is driven by a spiral axle 20, which branches off of a drive unit. In a corresponding manner, the threaded spindle 12 supports a worm gear 23 which is driven by a spiral axle 22, which comes from unit 19.

In constructing unit 19, two electric motors and, if necessary, two reduction gears can be combined, from which one electric motor drives the spiral axle 20 and the other electric motor drives the spiral axle 22, or both motors operate to drive the axles 20, 22 at the same time.

As shown in FIG. 7, it is possible to arrange only one electric motor to drive the two axles 20, 22. This motor is, if necessary, constantly coupled to axle 22 by a gear unit. The motor is coupled, if necessary, further to one gear unit, with the axle followed with one magnetic coupling. The motor and the magnetic coupling, and if necessary, both gear units, are associated in the unit 19. Should the vertical swinging axis be adjusted, then the magnetic coupling couples the electric motor with the axle 20 so that both axles 20, 22 turn and so that both junction points 3, 5 can be adjusted. However, should there be an adjustment around the horizontal swing axis 2, then the magnetic coupling uncouples the electric motor from the axle 20 so that now only the axle 22 turns and as a result the junction point 5 is adjusted.

In detail these structures operate as follows. An electric motor is associated with a gear unit in structure 19 and this gear unit drives the axles 20, 22. The worm gear is arranged loosely on the axle 20.

A worm gear sits on the axle 20 with its rotatable jaw 25, which is moved axially by the electromagnet 24. Jaws 25 of the jaw coupling are normally in contact with the worm gear of the axle 20, through which the worm gear is actuated. However, should the electromagnet 25 be electrified, then the jaws are extended meshing into the worm gear, so that the latter is no longer able to turn. In structure 19 a differential gear is arranged, which drives both axles 20, 22. As an alternative, it is also possible to design a sliding clutch into the structure 19, over those points which being firmly fixed on the axle 20, are driven by the worm gear, whereby the sliding clutch grabs when the axle 20 is held still.

In the embodiment according to FIGS. 8 to 11, the ball joints of the further junction points 3, 5 are replaceable through a joint connection between an adjustable jaw 28, 32 and a pin 26, 27 where the pins 26, 27 are fixedly arranged on the reverse side of the mirror holder 6. The adjustable jaw 28, 32 is arranged on the previously mentioned spindle 12, 13.

The structure of the adjustable jaw for the junction point 5 is shown in FIG. 10. The adjustable jaw 28 is equipped with a slot 29 on the side, in which the pin 27 passes. This slot 29 is enlarged conically on both sides so that the pin 27 is guided through the middle of the slot.

With respect to the junction point 3, a bore 33 is arranged in the side of the adjustable jaw 32 through which the pin 26 runs. This bore 33 is enlarged conically on both sides, so that the pin 26 is guided through the middle of the bore 33.

In this way pins 26, 27 are capable of being variably adjusted squarely to the axis of the slot 29 with respect to the axis of bore 33.

Each adjustable jaw 28, 32 is provided with a transverse slot 30, in which a U-shaped spring 31 is arranged. The sides of this spring 31 grab the threads of the spindle 12 and 13 respectively. In this way it is again possible to adjust the mirror support manually through pressure in the area of the junction points 3, 5 since in this case the arms of the spring 31 spring over the threads.

I claim:

1. An electrically operated adjustable apparatus for a motor vehicle rear view mirror having a mirror casing and including therein a mirror support to which the mirror casing is connected via a first fixed junction point and two further junction points, one of said further junction points being located on a first straight line through said first fixed junction point and said two further junction points being located on a second straight line which is perpendicular to said first straight line, further including electric motor drive means linked by gear means to said further junction points for moving said mirror support so as to vary the distance between the mirror casing and mirror support, the electric motor drive means and the gear means being located in a separate housing of the casing on one side of said support, the housing having a housing wall at said one side thereof containing two slots therein in which driving means of said gear means for said further junction points are mounted for sliding movement along said slots.

2. Apparatus according to claim 1 in which the further junction points have ball joints mounted in sliding sockets which respectively lead to a slot in the housing and are driven by at least one spindle.

3. Apparatus according to claim 2 in which the sliding sockets each have a slot adjacent to the rotating side of the spindle, a spring wire located within the slot, by which the sliding socket is coupled to the threads of the spindle.

4. Apparatus according to claim 2 in which the mirror holder has two pins, each passing into an aperture of a corresponding sliding socket.

5. Apparatus according to claim 4 in which aperture is formed of a hole passing through the sliding socket.

6. Apparatus according to claim 5 in which both sides of the hole are expanded conically.

7. Apparatus according to claim 4 in which each aperture is formed of a pair of adjustable jaws.

8. Apparatus according to claim 7 in which both sides of the jaws are expanded conically, to facilitate a pivotal movement of pins inserted therein.

9. Apparatus according to claim 6 in which each adjustable jaw is equipped with a socket in which a U-shaped spring is located, having an arm which meshes into the threads of the spindle.

10. Apparatus according to claim 7 in which each adjustable jaw is equipped with a socket in which a U-shaped spring is located, having an arm which meshes into the threads of the spindle.

11. Apparatus according to any one of claims 2–9 or 10 further including means for driving the spindles by worm-gear mechanism means.

12. Apparatus according to claim 1, 2, 3, 5, 6 or 8 including a single electric motor operatively linked for moving said one further junction point via a gear unit, and for moving the other further junction point via a gear unit and a clutch, the electric motor and clutch forming one unit, worm gear mechanism means extending on both sides of the electric motor and clutch unit, and spindles which are respectively driven by the worm-gear mechanism means.

13. Apparatus according to claim 1, 2, 3, 5, 6 or 8 including a single electric motor operatively linked for moving each further junction point by rotation of a gear means, a stopping mechanism which is adapted to arrest the gear at said one further junction point, said gear means coupled to the motor and forming a single unit, spindles being respectively driven by said gear means, worm-gear mechanism means extending from the electric motor and clutch unit, said stopping mechanism being comprised of a clutch coupling, extending from the end of the worm-gear mechanism means.

14. Apparatus according to claim 1, 2, 3, 5, 6 or 8 including a single electric motor operatively linked for moving each further junction point by rotation of a gear means, a stopping mechanism which is adapted to arrest the gear at said one further junction point, a slip clutch coupled to the motor and forming a single unit therewith and adapted to move said other further junction point, spindles being respectively driven by said gear means, worm-gear mechanism means extending from the electric motor and clutch unit, said stopping mechanism being comprised of said clutch coupling which extends from the end of the worm-gear mechanism means.

15. Apparatus as defined in claim 13 further including means for electromagnetically operating the clutch coupling and electromagnetically disconnecting the clutch coupling from the associated worm-gear mechanisms when operated.

16. Apparatus according to claim 1, 2, 3 or 4 in which each said further junction point is linked to an electric motor, both of which are operative to adjust the mirror support vertically relative to the straight line.

17. Apparatus according to claim 1, 2, 3 or 4 including a single electric motor being operatively linked for moving said one further junction point via a gear unit and for moving the other further junction point via a gear unit and a clutch.

18. Apparatus according to claim 1, 2, 3 or 4 including a single electric motor operatively linked for moving each further junction point by rotation of a gear, and a stopping mechanism at said one further junction point adapted to arrest the gear.

19. Apparatus as defined in claim 14 further including means for electromagnetically operating the clutch coupling and electromagnetically disconnecting the clutch coupling from the associated worm-gear mechanisms when operated.

* * * * *